United States Patent
Ebert et al.

(10) Patent No.: US 6,889,811 B2
(45) Date of Patent: May 10, 2005

(54) HYDRAULICALLY OPERATED CLUTCH SYSTEM

(75) Inventors: Angelika Ebert, Schweinfurt (DE); Jochen Kuhstrebe, Westheim (DE); Thomas Busold, Fulda (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/466,452

(22) PCT Filed: Jan. 22, 2002

(86) PCT No.: PCT/EP02/00579

§ 371 (c)(1), (2), (4) Date: Jul. 16, 2003

(87) PCT Pub. No.: WO02/061299

PCT Pub. Date: Aug. 8, 2002

(65) Prior Publication Data

US 2004/0045784 A1 Mar. 11, 2004

(30) Foreign Application Priority Data

Jan. 30, 2001 (DE) .............. 101 03 843

(51) Int. Cl.[7] .................. F16D 25/10
(52) U.S. Cl. .......... 192/87.13; 192/85 R; 192/87.15; 192/87.18
(58) Field of Search ............... 192/85 R, 87.11, 192/87.13, 87.15, 87.18; 91/49, 61, 437, 454; 137/565.37, 596

(56) References Cited

U.S. PATENT DOCUMENTS

| | | | |
|---|---|---|---|
| 4,591,038 A | 5/1986 | Asagi et al. | |
| 4,625,840 A | 12/1986 | Kojima et al. | |
| 4,657,041 A | * 4/1987 | Mitsui | 192/85 R |
| 5,105,922 A | 4/1992 | Yant | |
| 6,079,206 A | 6/2000 | Petrzik et al. | |
| 6,093,133 A | 7/2000 | Danielsen et al. | |
| 6,301,984 B1 | * 10/2001 | Petzold | 74/335 |
| 6,454,074 B1 | * 9/2002 | Kundermann et al. | 192/87.11 |
| 6,612,196 B1 | * 9/2003 | Petzold | 74/473.11 |

FOREIGN PATENT DOCUMENTS

| | | |
|---|---|---|
| DE | 30 28 251 C2 | 10/1991 |
| EP | 0 144 241 | 6/1985 |

* cited by examiner

Primary Examiner—Rodney H. Bonck
(74) Attorney, Agent, or Firm—Cohen, Pontani, Lieberman & Pavane (57) ABSTRACT

A clutch system includes a clutch device for positioning in a drive train between a drive unit and a transmission, and an actuating unit for hydraulically actuating the clutch device by means of at least one hydraulic slave-cylinder. The actuating unit has a hydraulic-medium delivery device for delivering a pressurized hydraulic medium, and a valve assembly, whose mediation allows the hydraulic medium to be supplied to and discharged from the slave-cylinder. The valve assembly comprises at least one supply valve, located in a hydraulic connection, between the hydraulic-medium delivery device and the slave-cylinder and at least one discharge valve, which is separate from the supply valve and located in a hydraulic connection, between the slave-cylinder and a hydraulic-medium reservoir.

17 Claims, 4 Drawing Sheets

HYDRAULICALLY OPERATED CLUTCH SYSTEM

PRIORITY CLAIM

This is a U.S. national stage of application No. PCT/EP02/00579, filed on Jan. 22, 2002. Priority is claimed on that application and on the following application(s): Country: Germany, Application No.: 101 03 843.7, Filed: Jan. 30, 2001.

BACKGROUND OF THE INVENTION

1. Field of the Invention

The present invention relates to a clutch system comprising a clutch device, in particular for arrangement in a drive train between a drive unit and a transmission, and comprising an actuating device for actuating the clutch device hydraulically by means of at least one hydraulic slave cylinder, the actuating device having a hydraulic-medium supply device for supplying pressurized hydraulic medium and a valve arrangement which can be used to feed hydraulic medium to the slave cylinder and discharge hydraulic medium from the slave cylinder.

2. Description of the Related Art

It is appropriate to design the valve arrangement with at least one proportional valve which is used for controlling/regulating the inflow of hydraulic medium into the slave cylinder and for controlling/regulating the discharge of hydraulic medium from the slave cylinder, since proportional valves are available which permit very precise metering of the hydraulic medium flowing into the slave cylinder and of the hydraulic medium flowing out of the slave cylinder and, accordingly, the clutch device can be actuated very sensitively with the effect of releasing or engaging it. Conventional automated clutch systems, for example, have thus been actuated by proportional and directional pressure-regulating valves.

However, proportional and directional pressure-regulating valves have to be manufactured keeping to exacting tolerances and are therefore comparatively costly. Furthermore, the leakage and control oil losses in the majority of proportional valves or servo valves are relatively high. If the clutch is to remain actuated (engaged in the case of a clutch of the NORMALLY OPEN type or released in the case of a clutch of the NORMALLY CLOSED type), the hydraulic-medium supply device, which generally has a hydraulic pump, has to accordingly continuously maintain a certain pressure level.

Another aspect is the ventilation of the hydraulic system, in particular of the hydraulic slave cylinder of the clutch system. Conventional clutch systems with a master cylinder which can be actuated by the clutch pedal have been ventilated by repeated actuation of the clutch pedal. Another possibility is to make the clutch system operationally ready by using a vacuum filling device. A vacuum filling device of this type will be required, in particular, for conventional clutch systems, in particular wet-running clutch systems, without a clutch pedal. However, a vacuum filling device of this type is relatively expensive and will not be able to be kept at hand by all garages. The conventional ventilation by repeated actuation of the clutch pedal, if this ventilation possibility is still provided at all, is also disadvantageous at least to the extent that it requires a comparatively large amount of time and, in practice, carelessness by the operator may cause errors to occur, with the slave cylinder not being completely ventilated.

OBJECT OF THE INVENTION

In contrast, the present invention is based on the object of making possible a simple, if appropriate automatic, ventilation of the slave cylinder and/or of supplying a clutch system with a valve arrangement which is constructed in a simple manner and which can be designed on the basis of cost-effective valves.

SUMMARY OF THE INVENTION

To achieve this object, the invention proposes that the valve arrangement has at least one feed valve which is arranged in a hydraulic connection between the hydraulic-medium supply device and the slave cylinder, and at least one discharge valve which is arranged in a hydraulic connection between the slave cylinder and a hydraulic-medium receptacle and is separate from the feed valve.

The valve arrangement according to the invention makes it possible, in order to ventilate the slave cylinder, for the feed valve and the discharge valve to both be kept open together for a certain period of time, so that a hydraulic-medium flow which passes through the slave cylinder or flows past a connection of the slave cylinder and ventilates the slave cylinder can occur. Furthermore, the design of the valve arrangement with the feed valve and the discharge valve which is separate from said feed valve makes it possible for valves of a simple design, for example ON/OFF valves of the seat valve type, to be able to be used for realizing the valve arrangement.

The invention is based on the finding that, if a feed valve and a discharge valve which can be actuated independently of each other are used, the clutch device can be actuated sufficiently sensitively and with precise metering, even with the omission of a proportional and directional pressure-regulating valve which is ideal per se for the precise and sensitive metering of the clutch actuation, if the feed valve, which is optionally designed as an ON/OFF valve, and the discharge valve, which is optionally designed as an ON/OFF valve, can be actuated in coordination with each other, if the need arises.

Simple ON/OFF valves or control valves have conventionally been used in conjunction with the transmission-internal clutches assigned to the individual gears of an automatic transmission (U.S. Pat. No. 6,093,133) and in pneumatically actuated motor vehicle friction clutches (DE 30 28 251 C2). Owing to the "binary" clutch actuation in the case of transmission-internal clutches (the clutches only adopt the states of COMPLETELY ENGAGED and COMPLETELY DISENGAGED) and the compressibility of the pneumatic medium used in pneumatically actuated clutches, the problem of precise and sensitive metering of the clutch actuation does not arise in the known systems or else arises in a completely different manner. Accordingly, measures have not been taken in these systems for an actuation of the ON/OFF valves in coordination with each other in the sense of the present invention.

It is particularly preferably proposed that the clutch system has a control/regulating unit which is installed for the purpose of actuating the feed valve and the discharge valve in coordination with each other in such a manner that an effective hydraulic-medium volume increment fed to the slave cylinder within a reference time interval is smaller than a minimum hydraulic-medium volume increment which can be metered by the feed valve in the reference time interval, and/or that an effective hydraulic-medium volume decrement which is discharged from the slave cylinder within a/the reference time interval is smaller than a minimum hydraulic-medium volume decrement which can be metered by the discharge valve in the reference time interval. It is intended in particular for the control/regulating unit to be configured for the purpose of actuating the valves in such a manner that a hydraulic-medium volume which is transmitted by the feed valve in the reference time interval and a hydraulic-medium volume which is transmitted by the discharge valve in the reference time interval are in each case larger than a minimum hydraulic-medium transmission volume which can be metered by the relevant valve, and that a hydraulic-medium volume which is fed into the slave cylinder or is discharged from the slave cylinder in the reference time interval is smaller than the minimum hydraulic-medium transmission volume which can be metered by the feed valve, and/or the minimum hydraulic-medium transmission volume which can be metered by the discharge valve.

According to this proposal of the invention, it is possible to use particularly simple valves which are relatively slow in terms of their actuation and could not by themselves meter the minimum hydraulic-medium volume increment or hydraulic-medium volume decrement necessary for the required sensitivity of the clutch actuation. This proposal of the invention is based on the consideration that the sensitivity and precision of the clutch actuation depend only on the hydraulic medium actually fed to the slave cylinder or discharged therefrom, but not on the hydraulic medium flowing through the individual valve.

The reference time interval may be in the order of magnitude of a design-induced minimum opening time interval of the feed valve and/or of the discharge valve or may essentially correspond to this minimum opening time interval. The minimum opening time interval of the feed valve and of the discharge valve can determine or participate in the determination of the minimum hydraulic-medium transmission volume which can be metered by this valve and the minimum hydraulic-medium volume increment or hydraulic-medium volume decrement which can be metered by this valve.

The control/regulating unit is preferably configured for the purpose of actuating the valves in coordination in terms of time with each other in such a manner that i) for feeding a hydraulic-medium volume increment to the slave cylinder which is smaller than the minimum hydraulic-medium volume increment which can be metered by the feed valve, the discharge valve is opened later than the feed valve by a time-delay interval and/or the discharge valve is closed earlier than the feed valve by a time-delay interval; and/or that ii) for discharging a hydraulic-medium volume decrement from the slave cylinder which is smaller than the minimum hydraulic-medium volume decrement which can be metered by the discharge valve, the feed valve is opened later than the discharge valve by a time-delay interval and/or the feed valve is closed earlier than the discharge valve by a time-delay interval. The time-delay interval can be significantly smaller than the design-induced minimum opening time interval of the feed valve and/or of the discharge valve.

With regard to the ventilation of the slave cylinder that has been addressed above, it is proposed that a/the control/regulating unit of the clutch system is configured for the purpose of keeping the feed valve and the discharge valve open in a ventilation operating state in order to ventilate the slave cylinder over a ventilation time interval, so that a hydraulic-medium flow which passes through the slave cylinder or flows past a connection of the slave cylinder and ventilates the slave cylinder occurs. The control/regulating unit is preferably configured for the purpose of producing, by means of corresponding activation of the feed valve and/or of the discharge valve and/or of the hydraulic-medium supply device, pressure fluctuations and/or fluctuations of the volume flow of the hydraulic-medium flow passing through the slave cylinder or flowing past the connection thereof, in order to assist the ventilation of the slave cylinder.

A/the control/regulating unit of the clutch system can be configured for the purpose, in a holding operating state with the feed valve closed and discharge valve closed, of setting the hydraulic-medium supply device into a standby state in which the hydraulic-medium supply device consumes less power than in a hydraulic-medium feeding state in which hydraulic medium is fed via the feed valve.

It has already been mentioned that the feed valve and/or the discharge valve can be designed as an ON/OFF valve, in which case for both valves the design of the valve as a valve of the NORMALLY OPEN type or as the NORMALLY CLOSED type is suitable. In order to minimize leakage losses, the feed valve and/or the discharge valve is/are preferably designed as a seat valve.

However, it is also suitable for the feed valve and/or the discharge valve to be designed as a proportional valve. The specific intention is for a proportional valve of the design in which at least one valve element can take up intermediate positions between a maximum opening position and a closing position in order to vary an opening cross-sectional surface and has, however, comparatively small control oil losses owing to its design in a manner similar to a seat valve. In the case of a corresponding, known proportional valve, the travel of a tappet used as the valve element is proportional to the control flow and the effective opening cross-sectional surface changes along the travel of the tappet (an effective opening cross-sectional surface which is proportional to the flow is preferably achieved).

The invention can be used in principle universally in hydraulically actuated motor vehicle friction clutches of a wide variety of designs. The slave cylinder can thus act on a motor vehicle friction clutch via a disengaging bearing arrangement, for example. However, a clutch system of this type is especially intended where the slave cylinder is integrated in a group of components of the clutch device which rotate at the same time during operation. The feed valve and the discharge valve may be arranged in a stationary manner with respect to said group of components and may be connected to the slave cylinder via a rotational connection.

The clutch device may be a "multiple clutch device" or a double clutch device. The clutch device may accordingly have at least one first slave cylinder which is assigned to a first clutch arrangement and at least one second slave cylinder which is assigned to a second clutch arrangement. For a clutch device of this type, it is proposed that the valve arrangement has at least one first feed valve which is arranged in a hydraulic connection between the hydraulic-medium supply device and the first slave cylinder, and at least one first discharge valve which is arranged in a hydraulic connection between the first slave cylinder and the hydraulic-medium receptacle and is separate from the first feed valve, and that the valve arrangement has at least one second feed valve which is arranged in a hydraulic connection between the hydraulic-medium supply device and the second slave cylinder and at least one second discharge valve which is arranged in a hydraulic connection between the second slave cylinder and the hydraulic-medium receptacle and is separate from the second feed valve. The first clutch arrangement can be assigned to a first transmission input shaft and the second clutch arrangement can be assigned to a second transmission input shaft of a power shift transmission. The clutch arrangement may have at least one wet-running clutch arrangement, in particular a multidisk clutch arrangement. Such a design of the clutch device is advantageous particularly in the case of a multiple or double clutch device for the first and the second clutch arrangements.

DETAILED DESCRIPTION OF THE PRESENTLY PREFERRED EMBODIMENTS

Figure 1:
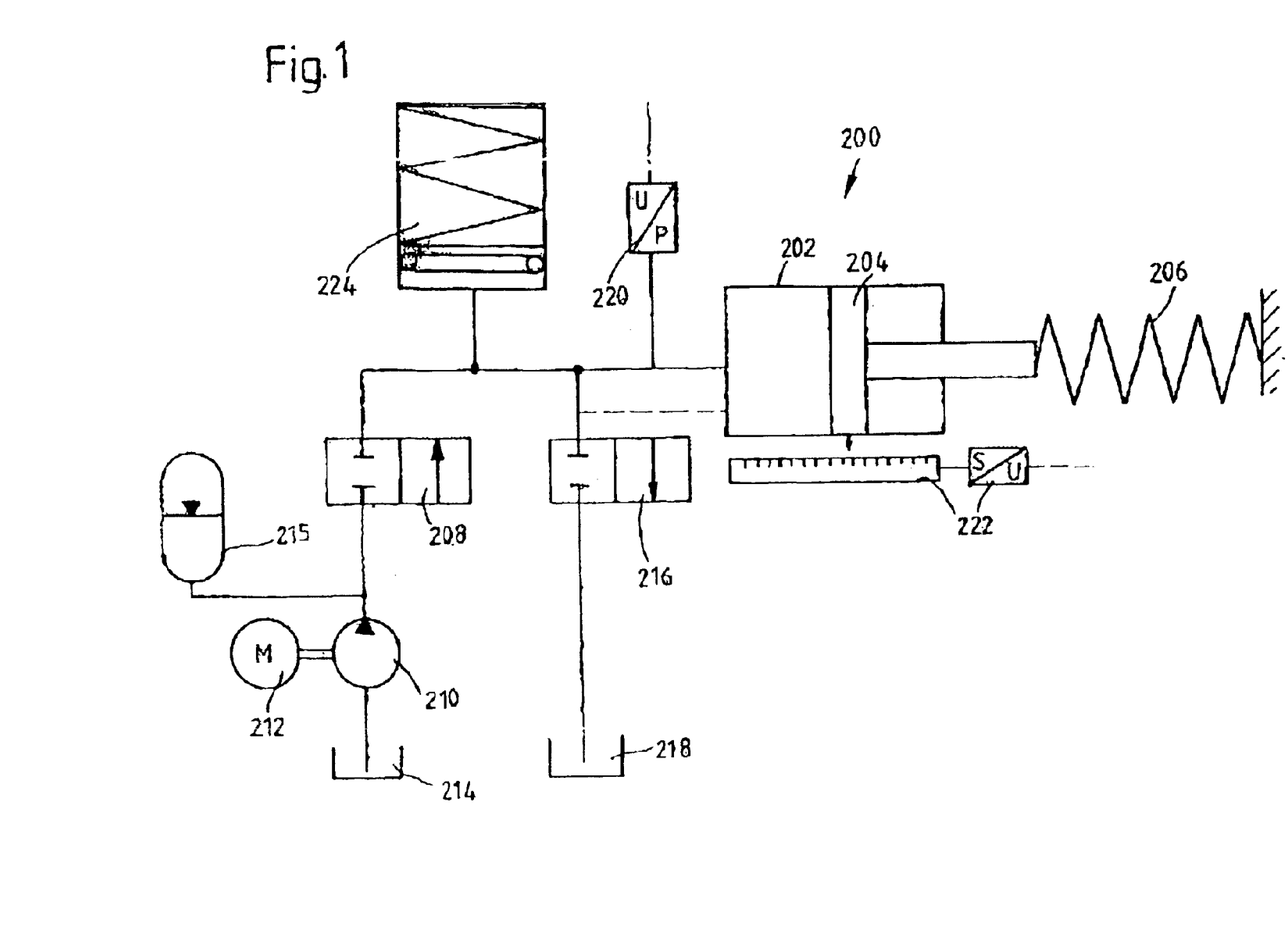
FIG. 1 shows, schematically, a hydraulic slave cylinder of a clutch system together with a valve arrangement according to the invention which comprises a feed valve and a discharge valve.

FIG. 1 shows an actuating device for actuating a motor vehicle friction clutch (not illustrated specifically) by means of a hydraulic slave cylinder 202 which has an actuating piston 204. The manner in which the actuating piston interacts with associated clutch components is not of interest in conjunction with the present invention. The clutch can be a clutch of the NORMALLY OPEN type or of the NORMALLY CLOSED type. A restoring spring arrangement is indicated symbolically at 206, said arrangement releasing the clutch in the case of a clutch of the NORMALLY OPEN type and engaging the clutch in the case of a clutch of the NORMALLY CLOSED type.

The hydraulic slave cylinder 202 is connected via a feed valve 208 to a hydraulic pump 210 which supplies hydraulic pressure oil and is driven by a motor 212. The hydraulic pump 210 sucks up hydraulic oil from a reservoir 214. It is possible to provide a hydraulic accumulator 215 which can supply short-term pressure/volume peaks and thus enables the pump 210 to be configured with a lower output. Furthermore, a hydraulic accumulator of this type is advantageous, since it damps pressure surges. The hydraulic slave cylinder 202 is furthermore connected via a discharge valve 216 to a reservoir 218. The reservoirs 214, 218 may be formed by a common reservoir (oil sump).

The feed valve 208 is used for controlling/regulating the inflow of oil from the pump 210 to the slave cylinder 202. The discharge valve 216 is used for controlling/regulating the outflow of oil from the hydraulic slave cylinder 202 into the reservoir 218. In the exemplary embodiment shown in FIG. 1, the feed valve 208 and the discharge valve 216 are each formed by an ON/OFF valve. The two ON/OFF valves can be of the NORMALLY OPEN type or of the NORMALLY CLOSED type. It is also possible for one of the two valves to be of the NORMALLY OPEN type and the other to be of the NORMALLY CLOSED type.

If the smallest volume increment or volume decrement which can be metered by means of the feed valve or the discharge valve, i.e. the oil volume transmitted in the direction of the slave cylinder or the oil volume transmitted in the direction of the reservoir 218, is larger than is required per se for the desired actuation of the clutch (this would lead to an excessive rise or drop in pressure and accordingly to the clutch being released or engaged too severely), combined actuation of both valves can result in the correct oil volume being fed to the hydraulic slave cylinder or the correct oil volume being let out of the slave cylinder. If, for example, the oil volume $V_{des}$ is to be fed to the hydraulic slave cylinder, and if this desired volume is smaller than the minimum volume $V_{min}$ which can be metered by the feed valve 208 (minimum transmission volume $V_{min}$ of the feed valve 208), then the feed valve 208 can be used, for example, to feed the entire volume $V_0=V_1+V_{des}$ and the discharge valve 216 can be used in coordination therewith to let out the volume $V_1$ to the reservoir 218 in order ultimately to feed precisely the desired volume $V_{des}$ to the hydraulic slave cylinder 202. The partial volume $V_1$ to be discharged via the discharge valve 216 has to be at least identical to the minimum volume $V_{min}$ which can be metered by the discharge valve 216. Without restricting the general nature, it may be assumed here that the feed valve 208 and the discharge valve 216 have the same minimum transmission volume $V_{min}$ which can be metered. In this case, the feed valve 208 has to be used to feed at least the volume $V_0=V_{min}+V_{des}$, the partial volume $V_{min}$ of which is let off via the discharge valve 216 to the reservoir 218.

In a corresponding manner, combined actuation of the valves 208 and 216 enables a desired volume $V_{des}$ which is smaller than the minimum volume $V_{min}$ which can be metered by the discharge valve 216 (minimum transmission volume $V_{min}$ of the discharge valve 216) to be let out of the hydraulic slave cylinder 202. For this purpose, an oil volume $V_1$ is fed via the feed valve 208 and an oil volume $V_0=V_1+V_{des}$ is let out in coordination therewith via the discharge valve 216. The oil volume fed via the feed valve 208 has to be at least identical to the minimum transmission volume $V_{min}$ of the feed valve 208. Assuming in turn that the two valves 208 and 216 can meter the same minimum transmission volume $V_{min}$, then the discharge valve 216 has to be used to let out at least the volume $V_0=V_{min}+V_{des}$, the partial volume $V_{min}$ of which corresponds to the volume fed via the feed valve 208. Then, overall, only the desired volume $V_{des}$ is let out of the hydraulic slave cylinder 202.

Figure 2:
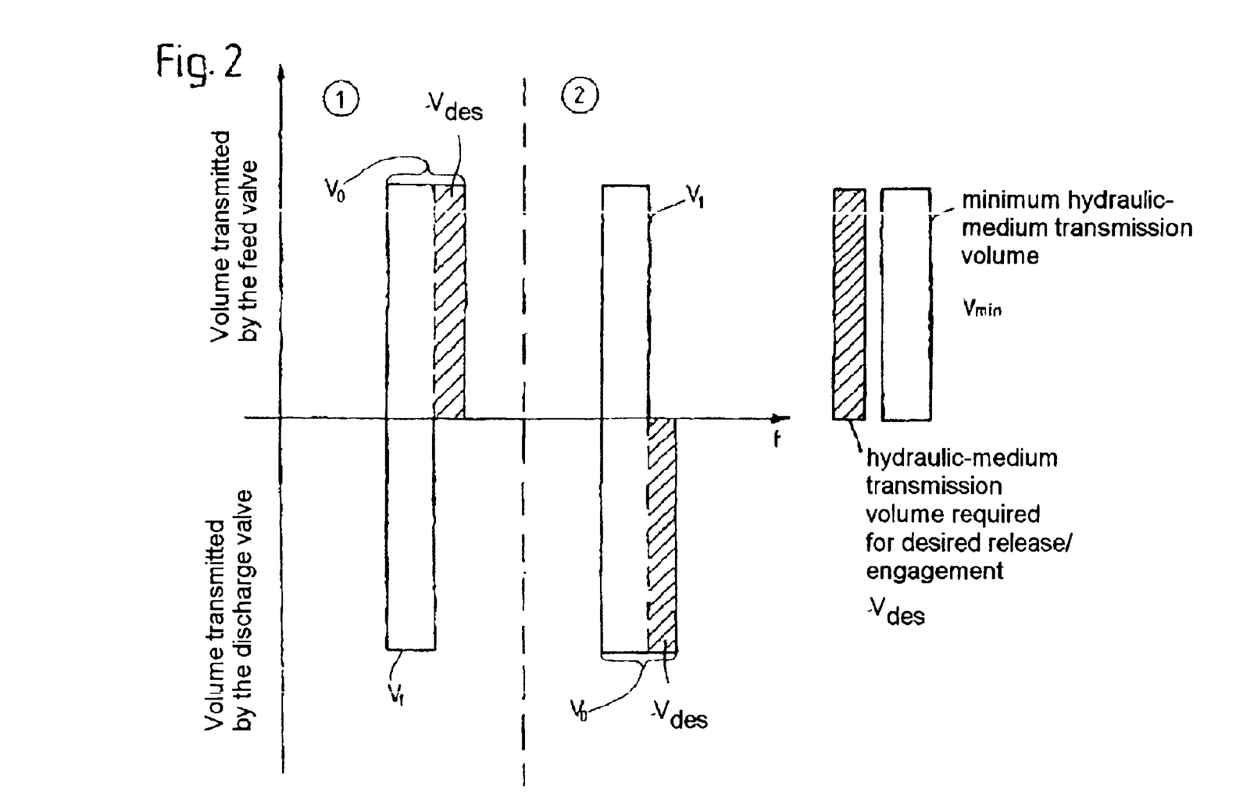
FIG. 2 is a schematic diagram which is used to illustrate an actuation of the feed valve and of the discharge valve in coordination with each other.

The above-explained combined actuation of the feed valve and of the discharge valve is illustrated by way of example in the diagram of FIG. 2. In order to feed the desired volume $V_{des}$ which is smaller than the minimum transmission volume $V_{min}$ of the feed valve 208 to the hydraulic slave cylinder, according to diagram part 1, the feed valve 208 is used to feed the entire volume $V_0$ and the discharge valve 216 is used to let out the partial volume $V_1$, for example the minimum transmission volume $V_{min}$. In a corresponding manner, in order to let out (discharge) the desired volume $V_{des}$, which is smaller than the minimum transmission volume of the discharge valve 216, according to diagram part 2, the feed valve 208 is used to feed the volume $V_1$, for example the minimum transmission volume $V_{min}$, and the discharge valve 216 is used to let out the entire volume $V_0$.

In order to set a desired pressure or a desired engagement/release of the clutch, the valves 208 and 216 can be actuated as a function of the measuring result of a pressure sensor 220 and/or as a function of the measuring result of a travel sensor 222. In the case of a linear spring characteristic of the restoring spring 206, the travel measured by the travel sensor 222 is essentially proportional to the pressure.

In order to ensure that the clutch actuation can be readily regulated/controlled, a hydraulic damper 224 (for example, comprising a spring-loaded piston, a metal bellows spring or the like) can be connected parallel to the hydraulic slave cylinder 202. A hydraulic damper of this type is used to damp pressure peaks in the hydraulic system.

The valves 208 and 216 are preferably designed as seat valves which have greatly reduced leakage in comparison to conventionally used proportional or servo valves. This makes it possible for the pressure supply unit 210, 212 to be switched into a manner of standby mode if the valves 208, 216 are closed during a prolonged holding operating state of the slave cylinder 202. This enables the energy consumption of the entire system to be reduced. A reduction in the energy consumption of the entire system also arises from the fact that use is made in the exemplary embodiment of ON/OFF valves which, in contrast to conventional proportional or servo valves, do not have substantial control oil losses.

The use of at least one feed valve and of at least one discharge valve which is separate from said feed valve affords the particular advantage that, during the first filling of the hydraulic system with hydraulic oil or after repair work has been carried out, simple ventilation of the hydraulic system, including the hydraulic slave cylinder 202, is possible by means of these valves. For ventilation purposes, the two valves are opened, so that oil continuously flows through the hydraulic system for a certain period of time and the resultant oil flow ventilates the slave cylinder 202. In this case, it is not necessary for an oil flow also to flow through the slave cylinder 202 itself, but rather it is sufficient if there is merely a feed line to the slave cylinder and the oil flow is conducted to a certain extent past the slave cylinder. In particular, it is expedient for such a connection situation of the slave cylinder to produce, by means of corresponding actuation of at least one of the valves 208 and 216 and/or of the pressure supply unit 210, 212, pulsations in the oil volume flow which cause pressure fluctuations in the slave cylinder and thereby assist the ventilation of the slave cylinder. However, as regards effective and rapid ventilation of the slave cylinder, it is also entirely expedient to conduct the oil volume flow through the slave cylinder, for which purpose the slave cylinder is to be designed with two connections, one for feeding oil via the feed valve 208 into the slave cylinder and one for discharging oil from the slave cylinder via the discharge valve 216 into the reservoir 218. This design possibility is indicated by dashed lines in FIG. 1.

The explained self-ventilating function of the actuating device is particularly advantageous insofar as a costly vacuum filling device for the initial operation can be omitted and accordingly also simple maintenance can take place in a normally equipped garage.

With regard to the combined actuation of the feed valve 208 and of the discharge valve 216 that is addressed in conjunction with the diagram of FIG. 2, the following, purely exemplary numerical examples are to be given. The effective minimum time interval for which an ON/OFF valve is at least open, for example owing to the design, is, for example, 5 to 10 ms. A typical minimum oil transmission volume of the valves of approximately 1 ml, for example (depending on the oil pressure), corresponds to this time interval.

For sensitive control/regulation of the clutch actuation, oil volume increments/decrements of approximately 10 $\mu$l, for example, will have to be metered, depending in each case on the configuration of the slave cylinder. In the numerical example given here, this minimum desired volume ($V_{des}$) is 1% of the transmission volume which can be metered by the feed valve or the discharge valve on its own. This desired oil volume which is required for sufficiently sensitive regulation/control of the clutch actuation and which is fed to the hydraulic slave cylinder or is discharged therefrom can be metered in the described manner by means of combined actuation of the feed valve and of the discharge valve. Taking the above-stated numerical examples as a starting point, a control cycle of approximately 100 $\mu$s, on the basis of which the valves are activated, is sufficient for this.

Figure 3:
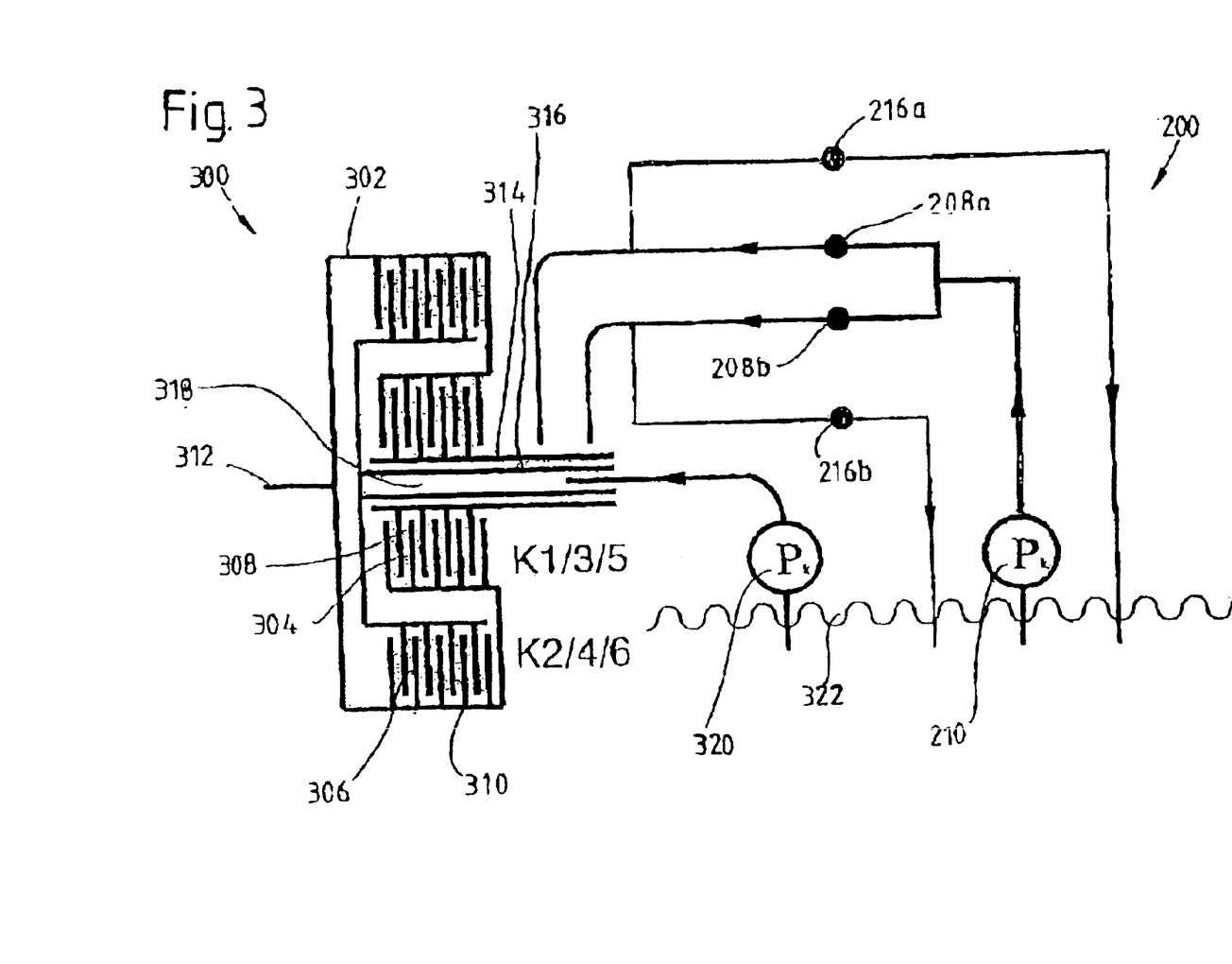
FIG. 3 shows, in a schematic illustration, an exemplary embodiment of a clutch system according to the invention with a hydraulically actuable double clutch.

FIG. 3 shows an example of a clutch system 300 according to the invention with a double clutch 302 which has a radially inner clutch arrangement 304 and a radially outer clutch arrangement 306. The two clutch arrangements are represented in each case merely by a schematically indicated multidisk bundle 308 and 310 and are used in a manner known per se to connect an engine output shaft 312 or the like to an associated transmission input shaft 314 and 316 of a power shift transmission or the like for the purpose of transmitting torque. The radially inner clutch arrangement 304 is assigned, for example, to the transmission gears 1, 3 and 5, and the radially outer clutch arrangement 306 is assigned, for example, to the transmission gears 2, 4 and 6. The transmission input shafts 314 and 316 are designed as coaxially nested hollow shafts. Via an oil duct 318 formed therein, cooling oil can be fed by means of a cooling oil pump 320 from an oil sump 322 to the multidisk bundles 308 and 310.

Two hydraulic slave cylinders are integrated in the double clutch 302, said slave cylinders each having an actuating piston assigned to one of the two multidisk bundles and being used to clamp the relevant multidisk bundle in place against the action of a restoring spring arrangement acting on the piston (clutch arrangement of the NORMALLY OPEN type) or to relieve the multidisk bundle of the clamping action of an engaging spring arrangement for disengagement purposes (clutch arrangement of the NORMALLY CLOSED type).

The hydraulic slave cylinder of the radially outer clutch arrangement 306 is assigned a feed valve 208a and a discharge valve 216a which are connected to the hydraulic slave cylinder via an oil line arrangement, a rotational connection (not illustrated) and an oil duct formed in the nested transmission input shafts. In a corresponding manner, the hydraulic slave cylinder of the radially inner clutch arrangement 304 is assigned a feed valve 208b and a discharge valve 216b which are connected to the relevant hydraulic slave cylinder via an oil line arrangement, a rotational connection (not illustrated) and an oil duct formed between the nested transmission input shafts. The feed valves 208a and 208b are used to feed pressure oil from the pressure oil pump 210, which sucks up oil from the reservoir 322, to the particular hydraulic slave cylinder. The discharge valves 216a and 216b are used for letting out oil from the respective hydraulic slave cylinder to the reservoir 322. The feed valve 208a and the discharge valve 216a can be actuated in combination in the manner explained in conjunction with FIGS. 1 and 2 in order to set a desired volume increment and a desired volume decrement. In the same manner, the feed valve 208b and the discharge valve 216b can be actuated in combination in order to set a desired volume increment and a desired volume decrement. Furthermore, the feed and discharge valves make it possible to ventilate the hydraulic slave cylinders of the double clutch in a simple manner. The actuation of the valves for setting the desired volume increments and the desired volume decrements and for ventilating the slave cylinder advantageously takes place by means of a correspondingly configured control/regulating unit (not illustrated) which activates the valves and can be realized on the basis of a microprocessor.

One example of a multiple clutch device which can be used as part of a clutch system according to the invention will be explained in greater detail below with reference to FIG. 4. It specifically concerns a double clutch device, double clutch in short.

Figure 4:
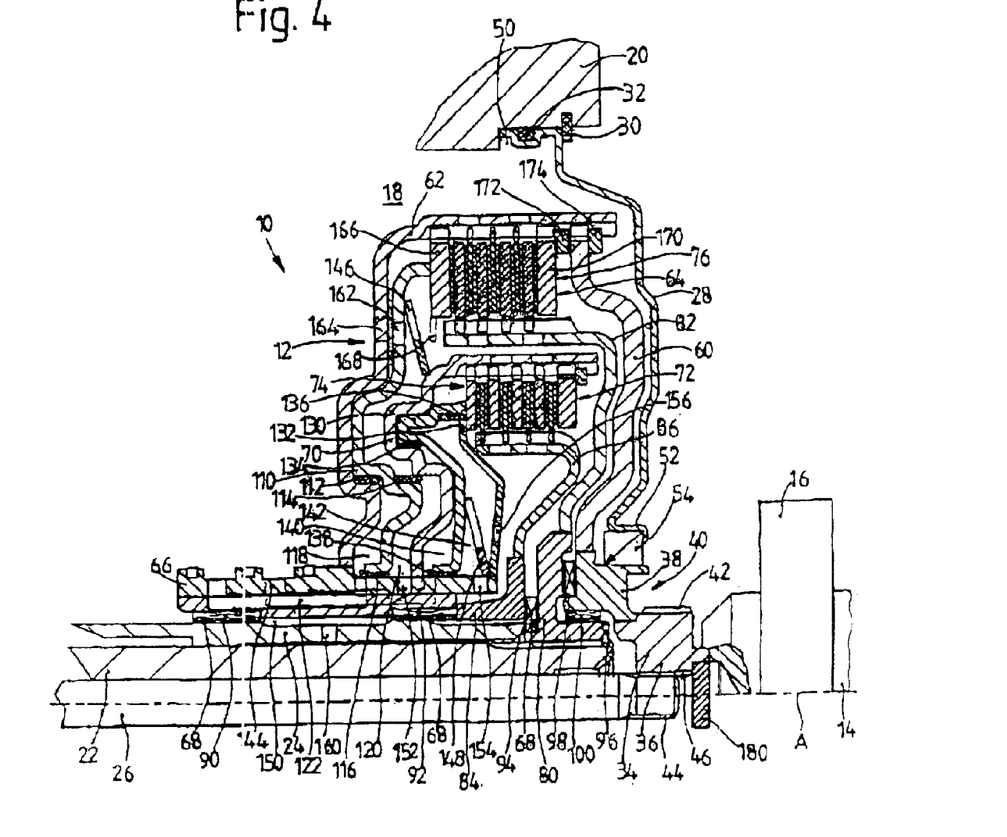
FIG. 4 shows, in a partially cut-away illustration, a double clutch which is arranged in a drive train of a motor vehicle between a transmission and a drive unit and has two multidisk clutch arrangements, which double clutch could be part of a clutch system according to the invention, for example of the clutch system of FIG. 3.

FIG. 4 shows a double clutch 12 which is arranged in a drive train 10 between a drive unit and a transmission. Of the drive unit, for example an internal combustion engine, only an output shaft 14, if appropriate crankshaft 14, with a coupling end 16 used for coupling it to a torsional vibration damper (not illustrated) is illustrated in FIG. 4. The transmission is represented in FIG. 4 by a transmission housing section 20, which bounds a transmission housing bell 18, and two transmission input shafts 22 and 24 which are both designed as hollow shafts, the transmission input shaft 22 extending through the transmission input shaft 24 essentially coaxially with respect to it. Arranged in the interior of the transmission input shaft 22 is a pump drive shaft which is used, as will be explained more specifically, to drive an oil pump (for example the oil pump 220) which is on the transmission side and is not illustrated in FIG. 4. The pump drive shaft may be omitted if at least one oil pump driven by electric motor is provided.

The double clutch 12 is accommodated in the transmission housing bell 18, the bell interior being closed in the direction of the drive unit by means of a cover 28 which is pressed into a bell housing opening and/or is secured therein by means of a snap ring 30. If the double clutch has wet-running friction clutches, for example multidisk clutches, as in the exemplary embodiment shown in FIG. 4, then it is generally appropriate to supply a sealing engagement between the cover 28 and the clutch housing formed by the transmission housing bell 18, it being possible for said sealing engagement to be produced, for example, by means of an O-ring or another sealing ring. A sealing ring 32 with two sealing lips is shown in FIG. 4.

As the input side of the double clutch 12, use is made of a clutch hub 34 which, for reasons yet to be explained in greater detail, comprises two annular sections 36, 38 which are fixed on each other. The clutch hub 34 extends through a central opening in the cover 28 in the direction of the drive unit and is coupled via an external toothing 42 to the torsional vibration damper (not illustrated), so that via the latter there is a torque transmission connection between the coupling end 16 of the crankshaft 14 and the clutch hub 34. If it is desired to omit a torsional vibration damper in general or at this point in the drive train, then the coupling hub 34 may also be coupled directly to the coupling end 16. The pump drive shaft 26 has, at its end remote from the transmission, an external toothing 44 which engages in an internal toothing 46 of the annular section 36 of the clutch hub 34, with the result that the pump drive shaft 26 rotates at the same time as the clutch hub 34 and accordingly drives the oil pump when a rotational movement is imparted to the clutch hub 34, as a rule by the drive unit and in some operating situations possibly also by the transmission via the double clutch (for example in an operating situation characterized by the key word "engine brake").

The cover 28 extends radially between an annular circumferential wall section of the housing bell 18, which section bounds a radial recess 50 of the housing bell 18, and the annular section 38 of the hub 34, it being advantageous if a sealing and/or rotational bearing arrangement 54 is provided between a radially inner wall region 52 of the cover 28 and the hub 34, specifically the annular section 38, specifically if—as in the exemplary embodiment shown—the cover 28 is fixed to the housing bell 18 and accordingly does not rotate at the same time as the double clutch 12. Sealing between the cover and the hub is required, in particular, if, as in the exemplary embodiment, the clutch arrangements of the double clutch are wet-running clutches. High operational reliability is achieved even if oscillations and vibrations occur if the sealing and/or rotational bearing arrangement 54 is secured axially on the cover 28 and/or on the clutch hub 34, for example by means of an end section of the cover edge 52 which is bent over radially inward, as can be seen in FIG. 4.

A carrier plate 60 is attached in a rotationally fixed manner to the annular section 38 of the hub 34 and is used for transmitting torque between the hub 34 and an outer disk carrier 62 of a first multidisk clutch arrangement 64. The outer disk carrier 62 extends toward the transmission and radially inward to an annular part 66 to which the outer disk carrier is attached in a rotationally fixed manner and which is mounted on the two transmission input shafts 22 and 24 by means of an axial and radial bearing arrangement 68 in such a manner that both radial and axial forces are supported on the transmission input shafts. The axial and radial bearing arrangement 68 permits a relative rotation between the annular part 66, on the one hand, and both the transmission input shaft 22 and the transmission input shaft 24, on the other hand. The design and manner of operation of the axial and radial bearing arrangement will be discussed more specifically later on.

An outer disk carrier 70 of a second multidisk clutch arrangement 72 is attached in a rotationally fixed manner to the annular part 66 axially further on in the direction of the drive unit, the disk bundle 74 of which clutch arrangement is annularly surrounded by the disk bundle 76 of the first multidisk clutch arrangement. The two outer disk carriers 62 and 70 are, as already indicated, connected to each other in a rotationally fixed manner by the annular part 66 and are jointly in torque transmission connection to the clutch hub 34, via the carrier plate 60 which is in form-fitting torque transmission engagement with the outer disk carrier 62 by means of an external toothing, and therefore—via the torsional vibration damper (not illustrated)—to the crankshaft 14 of the drive unit. Based on the normal flow of torque from the drive unit to the transmission, the outer disk carriers 62 and 70 are used in each case as the input side of the multidisk clutch arrangements 64 and 72, respectively.

A hub part 80 of an inner disk carrier 82 of the first multidisk clutch arrangement 64 is arranged in a rotationally fixed manner on the transmission input shaft 22 by means of a keyway toothing or the like. In a corresponding manner, a hub part 84 of an inner disk carrier 86 of the second multidisk clutch arrangement 72 is arranged in a rotationally fixed manner on the radially outer transmission input shaft 24 by means of a keyway toothing or the like. Based on the standard torque flow from the drive unit in the direction of the transmission, the inner disk carriers 82 and 86 are used as the output side of the first and second multidisk clutch arrangements 64 and 72, respectively.

Reference is made once again to the radial and axial mounting of the annular part 66 on the transmission input shafts 22 and 24. For radially mounting the annular part 66, use is made of two radial bearing subassemblies 90 and 92 which are effective between the radially outer transmission input shaft 24 and the annular part 66. The annular part 66 is mounted axially with regard to being supported in the direction of the drive unit via the hub part 84, an axial bearing 94, the hub part 80 and a snap ring 96 which axially secures the hub part 80 on the radially inner transmission input shaft 22. The annular part 38 of the clutch hub 34 is mounted on the hub part 80 again via an axial bearing 68 and a radial bearing 100. In the direction of the transmission, the hub part 80 is axially supported on an end section of the radially outer transmission input shaft 24 via the axial bearing 94. The hub part 84 can be supported directly on an annular stop or the like or on a separate snap ring or the like in the direction of the transmission on the transmission input shaft 24. Since the hub part 84 and the annular part 66 can be rotated relative to each other, an axial bearing can be provided between these components if the bearing 92 does not have both an axial bearing and also a radial bearing function. The latter is taken as the starting point with regard to the exemplary embodiment of FIG. 4.

Great advantages arise if, as in the exemplary embodiment shown, those sections of the outer disk carriers 62 and 70 which extend in the radial direction are arranged on an axial side of a radial plane, which extends orthogonally with respect to an axis A of the double clutch 12, and those sections of the inner disk carriers 82 and 86 of the two multidisk clutch arrangements which extend in the radial direction are arranged on the other axial side of this radial plane. This makes a particularly compact design possible, in particular if—as in the exemplary embodiment shown—disk carriers of one sort (outer disk carriers or inner disk carriers, in the exemplary embodiment the outer disk carriers) are connected in a rotationally fixed manner to each other and in each case serve as the input side of the relevant multidisk clutch arrangement with regard to the power flux from the drive unit to the transmission.

Actuating pistons for actuating the multidisk clutch arrangements are integrated in the double clutch 12, for the purpose, in the exemplary embodiment shown, of actuating the multidisk clutch arrangements with the effect of engaging them. An actuating piston 110 assigned to the first multidisk clutch arrangement 64 is arranged axially between the radially extending section of the outer disk carrier 62 of the first multidisk clutch arrangement 64 and the radially extending section of the outer disk carrier 70 of the second multidisk clutch arrangement 72 and is guided in an axially displaceable manner on the two outer disk carriers and on the annular part 66 by means of seals 112, 114, 116 and is guided in a manner sealing a pressure chamber 118, which is formed between the outer disk carrier 62 and the actuating piston 110, and a centrifugal pressure-equalizing chamber 120 formed between the actuating piston 110 and the outer disk carrier 70. The pressure chamber 118 is connected to an associated valve arrangement via a pressure medium channel 122, which is formed in the annular part 66, the pressure medium channel 122 being connected to the valve arrangement via a connecting sleeve which accommodates the annular part 66 and, if appropriate, is fixed on the transmission. The connecting sleeve and the annular part 66 form a rotational connection. With regard to the annular part 66, it should be mentioned in this connection that, in order to make it simpler to produce, it is produced in two parts, in particular with respect to the pressure medium channel 122 and a further pressure medium channel and has two sleeve-like annular-part sections which are inserted one inside the other, as indicated in FIG. 4.

An actuating piston 130 which is assigned to the second multidisk clutch arrangement 72 is arranged axially between the outer disk carrier 70 of the second multidisk clutch arrangement 72 and a wall part 132, which extends essentially radially and is attached in a rotationally fixed and fluid-tight manner to an axial end region of the annular part 66 that is remote from the transmission, and is guided in an axially displaceable manner on the outer disk carrier 70, the wall part 132 and the annular part 66 by means of seals 134, 136 and 138 and in a manner such that it seals a pressure chamber 140, which is formed between the outer disk carrier 70 and the actuating piston 130, and a centrifugal pressure-equalizing chamber 142 formed between the actuating piston 130 and the wall part 132. The pressure chamber 140 is connected in a corresponding manner to the pressure chamber 118 via a further (already mentioned) pressure medium channel 144 to an associated valve arrangement. The valve arrangements, which are connected on the other side to a pressure oil source (for example the pump 210) and a reservoir (for example the reservoir 322), can be used to apply an actuating pressure selectively (if appropriate, also simultaneously) to the two pressure chambers 118 and 140 in order to actuate the first multidisk clutch arrangement 64 and/or the second multidisk clutch arrangement 72 with the effect of engaging it/them. For resetting purposes, i.e. for releasing the clutches, use is made of diaphragm springs 146, 148, of which the diaphragm spring 148, which is assigned to the actuating piston 130, is accommodated in the centrifugal pressure-equalizing chamber 142.

The pressure chambers 118 and 140 are, in any case during normal operating states of the double clutch 12, completely filled with pressure medium (hydraulic oil here), and the actuating state of the multidisk clutch arrangements depends on the pressure medium pressure applied to the pressure chambers. Since, however, the outer disk carriers 62 and 70 together with the annular part 66 and the actuating piston 110 and 130 and the wall part 132 rotate at the same time as the crankshaft 14 in the driving mode, even without pressure being applied to the pressure chambers 118 and 140 by the pressure control device increases in pressure due to the centrifugal force occur in the pressure chambers and could, at least at relatively high speeds of rotation, result in inadvertent engagement or at least grinding of the multidisk clutch arrangements. For this reason, the already mentioned centrifugal pressure-equalizing chambers 120, 142 are provided, said chambers accommodating a pressure-equalizing medium and in which increases in pressure due to the centrifugal force occur in a corresponding manner, said increases compensating for the increases in pressure due to the centrifugal force which occur in the pressure chambers.

It could be considered filling the centrifugal pressure-equalizing chambers 120 and 142 permanently with pressure-equalizing medium, for example oil, in which case a volume control for receiving pressure-equalizing medium displaced in the course of the actuating pistons being actuated could be provided. In the embodiment shown in FIG. 4, the centrifugal pressure-equalizing chambers 120, 142 are in each case filled with pressure-equalizing medium only during operation of the drive train, specifically in conjunction with the supply of cooling fluid, in the exemplary embodiment shown specifically cooling oil, to the multidisk clutch arrangements 64 and 72 via an annular duct 150 which is formed between the annular part 66 and the outer transmission input shaft 24 and to which the bearings 90, 92 which are permeable to the cooling oil are to be added. The cooling oil, which is supplied, if appropriate, by the pump 320, flows from a connection on the transmission side between the annular part and the transmission input shaft 24 in the direction of the drive unit through the bearing 90 and the bearing 92 and then flows in a partial flow between that end section of the annular part 66 which is remote from the transmission and the hub part 84 radially outward in the direction of the disk bundle 74 of the second multidisk clutch arrangement 72, enters into the region of the disks on account of passage openings in the inner disk carrier 86, flows radially outward between the disks of the disk bundle 74 or through friction lining grooves or the like of these disks, enters through passage openings in the outer disk carrier 70 and passage openings in the inner disk carrier 82 into the region of the disk bundle 76 of the first multidisk clutch arrangement 64, flows radially outward between the disks of this disk bundle or through friction grooves or the like of these disks and then finally flows radially outward through passage openings in the outer disk carrier 62. The centrifugal pressure-equalizing chambers 120, 142 are also connected to the cooling-oil feed flow between the annular part 66 and the transmission input shaft 24, specifically by means of radial bores 152, 154 in the annular part 66. Since, when the drive unit is at a standstill, the cooling oil serving as the pressure-equalizing medium in the pressure-equalizing chambers 120, 142 flows out of the pressure-equalizing chambers due to a lack of centrifugal forces, the pressure-equalizing chambers are in each case newly filled again during operation of the drive train (of the motor vehicle).

Since a pressure-charging surface of the actuating piston 130 that is assigned to the pressure chamber 140 is smaller and, moreover, extends less far radially outward than a pressure-charging surface of the piston 130 that is assigned to the pressure-equalizing chamber 142, at least one filling-level-limiting opening 156 is formed in the wall part 132, said opening setting a maximum radial filling level of the pressure-equalizing chamber 142, which level produces the required compensation of centrifugal force. If the maximum filling level is reached, then the cooling oil fed via the bore 154 flows off through the filling-level-limiting opening 156 and combines with the cooling oil flow which emerges radially outward between the annular part 66 and the hub part 84. In the case of the piston 110, the pressure-charging surfaces of the piston that are assigned to the pressure chamber 118 and those which are assigned to the pressure-equalizing chamber 120 are identical in size and extend in the same radial region, so that corresponding filling-level-limiting means are not required for the pressure-equalizing chamber 120.

For the sake of completeness it should also be mentioned that yet further cooling oil flows preferably occur during operation. Thus, at least one radial bore 160 is provided in the transmission input shaft 24, via which and via an annular channel between the two transmission input shafts a further partial flow of cooling oil flows, which partial flow divides into two partial flows, one of which flows radially outward between the two hub parts 80 and 84 (through the axial bearing 94) and the other partial flow of which flows radially outward between that end region of the transmission input shaft 22 that is remote from the transmission and the hub part 80 and between this hub part 80 and the annular section 38 of the clutch hub 34 (through the bearings 98 and 100).

Further details of the double clutch 12 according to the exemplary embodiment described can readily be gathered from FIG. 4 by the expert. The axial bore in the annular section 36 of the clutch hub 34, in which bore the inner toothing 46 of the pump drive shaft is formed, is thus closed in an oil-tight manner by a stopper 180 fixed therein. The carrier plate 60 is fixed axially on the outer disk carrier 62 by means of two retaining rings 172, 174, the retaining ring 172 of which also axially supports the end disk 170. A corresponding retaining ring is also provided for supporting the disk bundle 74 on the outer disk carrier 70.

With regard to further details and advantageous refinements of the double clutch 12, reference is made to U.S. Pat. Nos. 6,464,059; 6,454,074; 6,471,026; 6,499,578; 6,491,149; and 6,523,657, the disclosure of which is hereby incorporated by reference. Note that FIG. 4 of the present application corresponds to FIG. 1 of this series of applications.

What is claimed is:

1. A clutch system comprising:
    a clutch device for installing in a drive train between a drive unit and a transmission;
    a hydraulic slave cylinder for actuating said clutch device hydraulically;
    a hydraulic medium supply device for supplying pressurized hydraulic medium;
    a hydraulic connection between said supply device and said slave cylinder;
    a feed valve in said hydraulic connection between said supply device and said slave cylinder for feeding hydraulic medium to the slave cylinder;
    a hydraulic medium receptacle;
    a hydraulic connection between said slave cylinder and said receptacle;
    a discharge valve arranged in said hydraulic connection between said slave cylinder and said receptacle for discharging hydraulic medium from said slave cylinder, said discharge valve being separate from said feed valve, and
    a control unit configured to keep the feed valve and the discharge valve open over a ventilation time interval during which a hydraulic medium flow ventilates said slave cylinder.

2. A clutch system as in claim 1 wherein said feed valve and said discharge valve can be actuated independently.

3. A clutch system as in claim 1 wherein said feed valve can meter a minimum hydraulic medium volume increment in a reference time interval, and said discharge valve can meter a minimum hydraulic medium volume increment in said reference time interval, said system further comprising a control unit which can actuate said feed valve and said discharge valve in coordination with each other so that an effective hydraulic medium volume increment, which is smaller than said minimum increment which can be metered by said feed valve, can be fed to the slave cylinder in said reference time interval, and so that an effective hydraulic medium volume increment, which is smaller than said minimum increment which can be metered by said discharge valve, can be discharged from said slave cylinder in said reference time interval.

4. A clutch system as in claim 3 wherein said control unit is configured so that said effective hydraulic medium volume increments are achieved by controlling said feed valve and said discharge valve so that the volume increments which are metered by said valves are larger than respective said minimum volume increments.

5. A clutch system as in claim 3 wherein said reference time interval corresponds to a minimum opening time interval of at least one of said feed valve and said discharge valve, wherein said opening time interval determines the minimum hydraulic medium volume increment which can be metered by the respective said valve.

6. A clutch system as in claim 5 wherein said control unit is configured so that an effective volume increment which is smaller than the minimum increment which can be metered by said feed valve is fed to said slave cylinder by at least one of opening said discharge valve later than said feed valve by a time delay interval and closing said discharge valve earlier than said feed valve by a time delay interval, and so that an effective volume increment which is smaller than the minimum increment which can be metered by said discharge valve is discharged from said slave cylinder by at least one of opening said feed valve later than the discharge valve and closing the feed valve earlier than the discharge valve.

7. A clutch system as in claim 6 wherein said time delay interval is significantly smaller than said minimum opening time interval.

8. A clutch system as in claim 1 wherein said control unit is configured to activate at least one of the feed valve and the discharge valve and the hydraulic medium supply device so that fluctuations in at least one of the pressure and the volume flow of the hydraulic medium occur.

9. A clutch system as in claim 1 further comprising a control unit configured to set the hydraulic medium supply device in a standby state when the feed valve and the discharge valve are closed, said supply device consuming less power in said standby state than when hydraulic medium is being fed by said feed valve.

10. A clutch system as in claim 1 wherein at least one of said feed valve and said discharge valve is an on/off valve.

11. A clutch system as in claim 1 wherein at least one of said feed valve and said discharge valve is a seat valve.

12. A clutch system as in claim 1 wherein at least one of said feed valve and said discharge valve is a proportional valve.

13. A clutch system as in claim 1 wherein at least one of said feed valve and said discharge valve comprises a valve element which can assume a position between a maximum open position and a closed position.

14. A clutch system as in claim 1 wherein said clutch device comprises a group of components which rotate at the same time during operation, said slave cylinder being integrated in said group of components, said feed valve and said discharge valve being stationary with respect to said group of components, said system further comprising a rotational connection connecting said valves to said slave cylinder.

15. A clutch system as in claim 1 wherein said clutch device comprises a first clutch and a second clutch, said slave cylinder being a first slave cylinder which actuates said first clutch hydraulically, said feed valve being a first feed valve, said discharge valve being a first discharge valve, said system further comprising:
   a second slave cylinder which actuates said second clutch hydraulically;
   a hydraulic connection between said supply device and said second slave cylinder;
   a second feed valve in said hydraulic connection between said supply device and the second slave cylinder for feeding hydraulic medium to the second slave cylinder;
   a hydraulic connection between said second slave cylinder and said receptacle; and
   a second discharge valve arranged in said hydraulic connection between said second slave cylinder and said hydraulic medium receptacle for discharging hydraulic medium from said second slave cylinder, said second discharge valve being separate from said second feed valve.

16. A clutch system as in claim 15 wherein said first clutch is assigned to a first transmission input shaft and said second clutch is assigned to a second input shaft.

17. A clutch system as in claim 1 wherein said clutch device is a multi-disk wet clutch.

* * * * *